(12) United States Patent
Hardjono et al.

(10) Patent No.: US 11,546,322 B1
(45) Date of Patent: Jan. 3, 2023

(54) DECENTRALIZED AVATAR AUTHENTICATION IN ONLINE PLATFORMS

(71) Applicant: Numéraire Financial, Inc., Chicago, IL (US)

(72) Inventors: Thomas P. Hardjono, Winchester, MA (US); Marsha Lipton, Chicago, IL (US)

(73) Assignee: NUMÉRAIRE FINANCIAL, INC., Chicago, IL (US)

(*) Notice: Subject to any disclaimer, the term of this patent is extended or adjusted under 35 U.S.C. 154(b) by 0 days.

(21) Appl. No.: 17/848,768

(22) Filed: Jun. 24, 2022

(51) Int. Cl.
*H04L 9/06* (2006.01)
*H04L 9/40* (2022.01)
*H04L 9/14* (2006.01)

(52) U.S. Cl.
CPC .............. *H04L 63/083* (2013.01); *H04L 9/14* (2013.01)

(58) Field of Classification Search
CPC ................................. H04L 63/083; H04L 9/14
USPC ............................................................ 726/7
See application file for complete search history.

(56) References Cited

U.S. PATENT DOCUMENTS

| | | | |
|---|---|---|---|
| 9,087,399 B2* | 7/2015 | Shuster | G06F 40/143 |
| 9,610,502 B2* | 4/2017 | Hamilton, II | H04L 63/168 |
| 2011/0010675 A1* | 1/2011 | Hamilton, II | H04L 63/107 |
| | | | 715/850 |
| 2019/0373015 A1* | 12/2019 | Kozloski | A63F 13/79 |

OTHER PUBLICATIONS

Fusing Blockchain and AI With Metaverse: A Surve, Jan. 2022 (Year: 2022).*
Artificial Intelligence for the Metaverse: A Survey, Huynh et al, Feb. 2022 (Year: 2022).*
Scavenger Hunt: Utilization of Blockchain and IoT fora Location-Based Game, Monzoor et al, Jan. 2020 (Year: 2020).*

* cited by examiner

*Primary Examiner* — Jahangir Kabir
(74) *Attorney, Agent, or Firm* — Nicholson De Vos Webster & Elliott LLP

(57) ABSTRACT

Techniques are described for using a decentralized group of authentication server nodes to prevent singular dependence upon any given online platform for authenticating avatars. For each epoch duration of time, a consensus protocol operating on a blockchain is used to elect an authentication server node. The elected node can then act as an authentication server on behalf of the online platform for that fixed epoch duration of time. Within this epoch of time, a client device (e.g., used by a user to access an online platform) performs a periodic heartbeat authentication with the elected authentication server node using an efficient authentication protocol that relies on a keyed-hashing mechanism. A client device can use the described system and authentication methods concurrently with multiple different online platforms (e.g., separate metaverses or other virtual worlds).

17 Claims, 10 Drawing Sheets

US 11,546,322 B1

DECENTRALIZED AVATAR AUTHENTICATION IN ONLINE PLATFORMS

BACKGROUND

There is a growing interest in metaverses and other virtual world-related platforms. Broadly, these technologies enable the creation of alternative digital universes in which users can participate. Many of these metaverses and other digital universes enable users to create an avatar representing the user (e.g., a graphical image, or a three-dimensional model, etc.) while the user engages with the digital universe and with other users.

BRIEF DESCRIPTION OF DRAWINGS

Various examples in accordance with the present disclosure will be described with reference to the drawings, in which.

DETAILED DESCRIPTION

Figure 1:
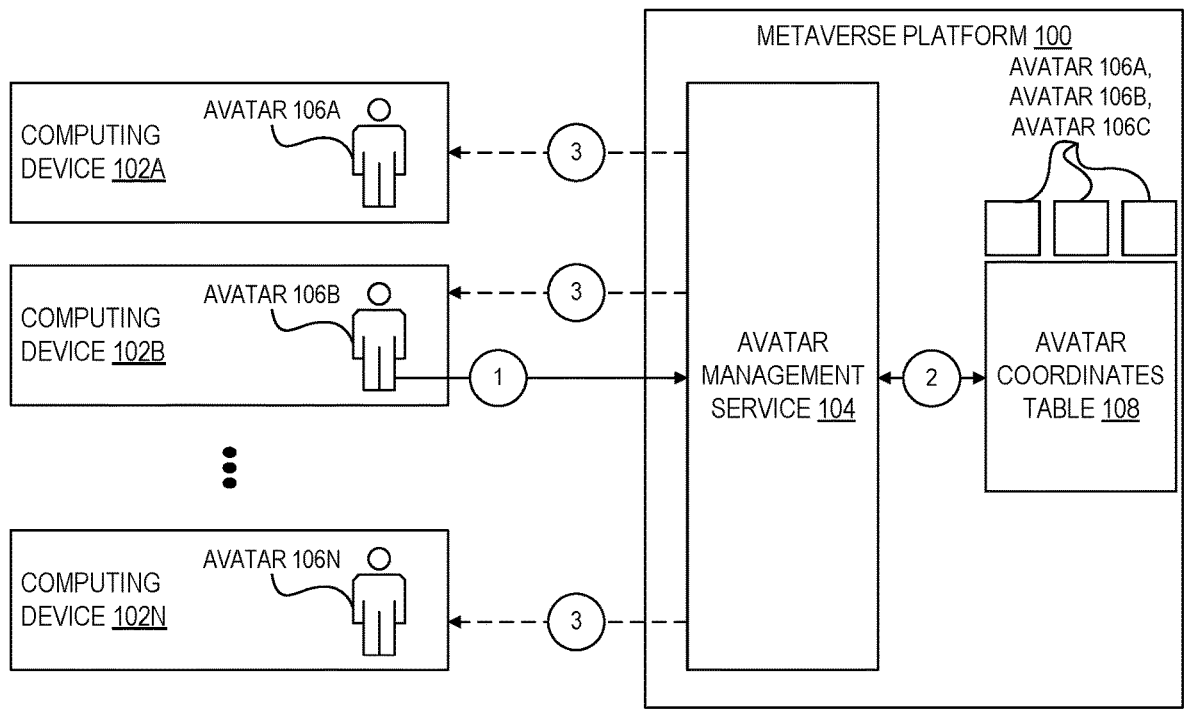
FIG. 1 is a diagram illustrating an example computing environment in which client computing devices use avatars in connection with a metaverse platform according to some examples.

The present disclosure relates to methods, apparatus, systems, and non-transitory computer-readable storage media for the continuous authentication of avatars (e.g., graphical representations of users or other objects) in online platforms (including, e.g., metaverses, video games, etc.) using a collection of decentralized authentication server nodes. For many types of entities that provide various types of computer-simulated environments (e.g., virtual worlds for social interaction, gaming, etc.), it can be beneficial for these entities to be able to prove the authenticity of users' avatars (e.g., represented by graphical images, three-dimensional models, or other types of data) across time. Without the ability to authenticate users' avatars, for example, the credibility and reputation of users within the online platform can be harmed by other users spoofing their identity or performing other malicious activities based on fraudulent copies of a user's avatar. Similarly, the value of object avatars can be harmed if other users can create fraudulent copies of the object avatar without an owner's permission.

These challenges with authenticating avatars in online platforms, among others, are addressed by a system utilizing a decentralized group of authentication server nodes to prevent singular dependence upon any given online platform for authenticating avatars. In some examples, for each epoch duration of time, one authentication server node from a set of candidate authentication server nodes is elected using a consensus protocol operating on a blockchain. The elected node can then act as an authentication server on behalf of the online platform for that fixed epoch duration of time. In some examples, within this epoch of time, a client device (e.g., used by a user to access an online platform) performs a periodic heartbeat authentication with the elected authentication server node using an efficient authentication protocol that relies on a keyed-hashing mechanism. Client computing devices can use the described system and authentication methods concurrently with multiple different online platforms (e.g., separate metaverses or other types of virtual worlds). Among other benefits, the techniques described herein provide for the efficient authentication of user avatars and other graphical objects used by users within a wide variety of virtual worlds, thereby improving the security and usefulness of such systems.

In some examples, an avatar (sometimes referred to as a user avatar or a metaverse avatar) is a graphical representation of a user, object, venue, or other item within one or more online platforms. For example, an avatar can include a two-dimensional image (e.g., a profile picture or graphical depiction of a user, object, or venue), a three-dimensional model (e.g., where such a model can be used within an online world of a metaverse, video game, or other three-dimensional online world), or any other type of data representing an object within a virtual world. As indicated, avatars can include user avatars (e.g., representing a human user), object avatars (e.g., representing a physical object within an online world), venue avatars (e.g., representing a two- or three-dimensional space within an online world), among other possible types of avatars. A human user typically controls the use of an avatar using some type of client computing device (e.g., a desktop computer, laptop, mobile devices, virtual reality (VR) devices, etc.).

In some examples, an online world (sometimes referred to as a "virtual world," "virtual space," or "metaverse") broadly refers to a computer-simulated environment, or a network of computer-simulated environments, which can be populated by users, objects, venues, etc., represented by one or more types of avatars as described herein. Users can use such online worlds for a wide variety of purposes including social connection, gaming, exploration, storytelling, etc. A metaverse or other online platform generally is owned and operated by metaverse operator, where the operator manages at least a portion of the computing infrastructure used to implement the metaverse and metaverse capabilities. In some examples, an online platform or metaverse can be identified within the described authentication system by a globally unique identifier, referred to as a metaverse network identifier.

The use of various types of avatars in metaverses and other online worlds generally occurs across time. For example, a user avatar or other type of object can be present in a metaverse for an entire length of time during which the user is engaged in the metaverse and can possibly be indefinitely present in the metaverse once created. As described in more detail hereinafter, the authentication of avatars can involve a heartbeat authentication process performed across epochs of time. In some examples, an epoch of time refers to a logical unit of time which is divisible into two or more distinct periods of time (e.g., an epoch can be defined as consisting of P periods of time). A period of time is a unit of time measured in a standard notation such as, e.g., seconds, minutes, hours, etc.

In some examples, the avatar authentication system described herein includes a collection of authentication server nodes. An authentication server node broadly represents a physical or virtual computing device (e.g., running in a datacenter, cloud-based computing environment, or any other computing environment) that participates in a blockchain network and that possesses authentication capabilities as described in more detail herein (e.g., as implemented by software running on an authentication server node). In some examples, some blockchain networks can be composed of nodes where only a subset of the nodes possesses the capability of being an authentication server node, while in other blockchain networks, all nodes may be capable of acting as an authentication server node. In some examples, the collection of authentication server nodes is controlled by an entity (e.g., an authentication service provider) that is separate from an entity controlling a computing environment providing one or more computer-simulated environments, e.g., to decouple the avatar authentication processes from any particular computer-simulated environment.

In some examples, an authenticating ticket (or "auth-ticket") is a message digest that accompanies a given avatar data file when the data file is transmitted by a client computing device to an authentication server node. As described in more detail herein, an authenticating ticket can permit an authentication server node to determine the source authenticity of an avatar data file and the liveliness of a challenge-response interaction between the client computing device and authentication server node in a given epoch of time.

In some examples, a periodic authenticating key (or "PAK") is a symmetric key used as one input into a key-hashed function that is used to generate the authenticating ticket for a given avatar data file. In some examples, a periodic challenge random (or "PCR") is a random value chosen by an authentication server node and send by a server to a client. In some examples, a periodic authenticating key set (or "PAK-set") is a set of keys intended for use within a given epoch of time between a client and an authentication server node. In some examples, periodic authenticating key evidence (or "PAK-evidence") can include a cryptographic hash of a periodic authenticating key that has been time-stamped and recorded by a client computing device onto a blockchain, and which permits the identification of the client computing device as its author. Before a client computing device can use a given periodic authenticating key within an epoch, the client computing device first records its corresponding periodic authenticating key evidence on the blockchain.

FIG. 1 illustrates an environment including a metaverse platform in which users can use avatars according to some examples. As indicated, with the emergence of tradeable digital assets in metaverses and other virtual worlds, there are a number of associated challenges related to ensuring the authenticity of various types of avatars (e.g., user avatars, object avatars, venue avatars, etc.). The numbered circles labeled "1" through "3" illustrate an example use case of such avatars in relation to a metaverse platform 100. In the example of FIG. 1, several computing devices (e.g., a computing device 102A, computing device 102B, . . . , computing device 102N, each broadly representing any type of computing device capable of interacting with a metaverse platform 100 over one or more computer networks) interact with an avatar management service 104 (or "AMS") of the metaverse platform 100.

As shown, a client device's interactions with the metaverse platform 100 involves the use of at least one avatar (e.g., an avatar 106A, avatar 106B, . . . , avatar 106N) chosen by each of the respective users of the client computing devices 102A, 102B, . . . , 102N. An avatar selected by a user, for example, can include an icon, image file, three-dimensional model, or the like, intended to be unique to and representative of that user. The avatar management service 104, for example, can include one or more applications, services, computing systems, or combinations thereof, used to maintain a virtual environment, or a portion thereof, across any number of connected client devices with the intent of presenting each user with a real-time visual experience in a consistent manner.

For objects that change position over time in a metaverse or other virtual world (e.g., dynamic, moveable objects such as user avatars, object avatars, etc.), an avatar management service 104 can also perform coordination and feedback tasks across client devices to ensure that movements of objects is visually represented across other clients. Thus, at circle "1" in FIG. 1 for example, when a user associated with client 102B provides input that causes their associated avatar 106B to move to a new location (e.g., associated with particular coordinates within a metaverse provided by the metaverse platform 100), at circle "2," the avatar management services 104 updates the coordinates associated with the avatar, e.g., in an avatar coordinates table 108. At circle "3," the avatar management service 104 can further transmit updated coordinates (e.g., indicating the new location of avatar 106B) to the client devices (optionally including the client 102B).

As indicated, there are a number of challenges associated with metaverse platforms and other virtual worlds in managing avatars. As one example, there are many challenges associated with the unauthorized copying or counterfeiting of image avatar files. For example, because an avatar generally is digital data (e.g., an image, an icon, a three-dimensional model, etc.) that is associated with a user's account on a metaverse platform, it is possible for others to copy an avatar by creating an authorized copy of the digital data. A malicious or unauthorized user can then present themselves in the metaverse platform using the authorized copy of the avatar, thereby potentially causing confusion among other users on the platform. These issues can also apply to object avatars (e.g., possibly representing luxury goods or other high value items), thereby leading to potential economic harm to a brand owner or other purveyor of object avatars in a metaverse. As another example challenge, each metaverse or virtual world platform is typically responsible for user authentication. The authentication of users thus relies on a decision made by a centralized entity, where that centralized entity becomes a single point of failure susceptible to security issues (and hackers), operational issues, and the like.

Decentralized Authentication Architecture for Metaverse Platforms

Figure 2:
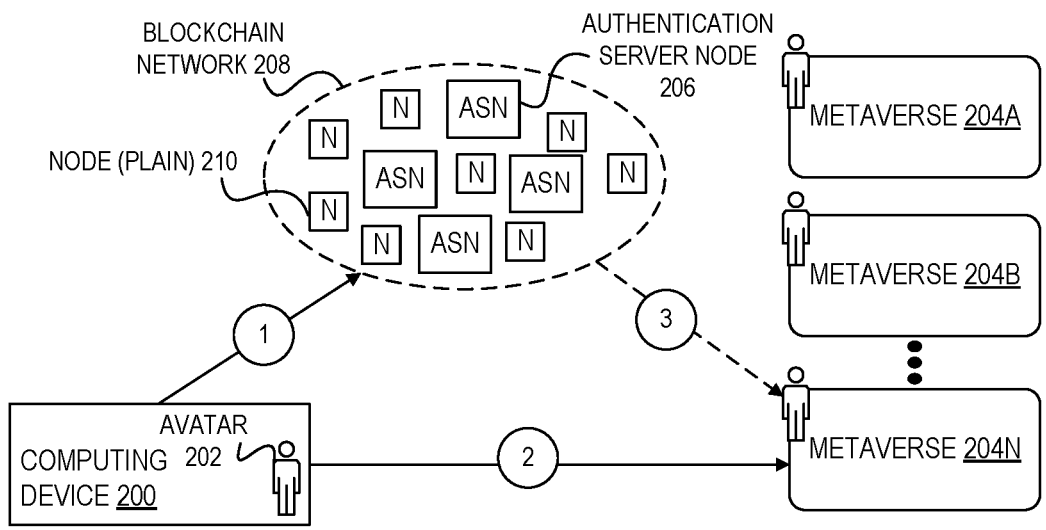
FIG. 2 is a diagram illustrating an example computing environment including a system used to perform decentralized avatar authentication across one or more metaverse platforms according to some examples.

According to examples described herein, a system is described including a collection of decentralized authentication entities used to authenticate avatars for use in various types of metaverses and other virtual worlds. FIG. 2 is a diagram illustrating an environment including a collection of decentralized authentication entities according to some examples. In the example of FIG. 2, a user using a computing device 200, and who is associated with an avatar 202, seeks to use the avatar 202 in connection with multiple metaverse platforms (e.g., each of metaverse platform 204A, metaverse platform 204B, . . . , and metaverse platform 204N) using the client computing device 200. In some examples, instead of authenticating multiple times (e.g., with avatar management services of each of the various metaverse platforms), a decentralized set of authentication server nodes (e.g., including authentication server node 206) are used in a blockchain network 208 (which can include other nodes 210 that do not act as authentication server nodes).

In some examples, since there can be more than one authentication server node in the blockchain network 208, a consensus protocol in the blockchain network 208 can be used to elect an authentication server node, from a set of candidate authentication server nodes, to be used to serve the user associated with the client computing device 200 for particular durations of time. Among other benefits, these processes can be used to obviate dependence on a centralized authenticating entity (e.g., an avatar management service of each metaverse platform). According to various examples, the decentralized authentication architecture provides independence from individual metaverse platforms (e.g., each authentication server node can be owned and operated by different entities, which means that an authentication server node is not beholden to any given metaverse platform owner). The described processes further record the results of authentication events to a blockchain. For example, a given authentication server node logs the outcome of authentication events (e.g., authenticating requests from client computing devices) onto the decentralized ledger of a publicly readable blockchain. This means that both users and metaverse platform owners (and any other interested parties) can read the logs written by the authentication server nodes and these parties can obtain assurance that the outcome of the event was truthfully recorded.

In some examples, the authentication server node chosen by the consensus protocol is chosen in a manner to reduce the chances of collusion between an authentication server node owner and a metaverse platform owner. For example, for each authentication event, the underlying consensus mechanism in the blockchain elects the authentication server node to be used to serve a corresponding client computing device.

Authentication Methods for Avatars Used in Metaverse Platforms

In some examples, when a user associated with an avatar (e.g., a creator or owner of a user avatar, object avatar, etc.) desires to prove the authenticity of the avatar and further to prove the user's control of the avatar, the user can provide evidence to satisfy an avatar authentication server node. At a high level, a user can do so by proving the authenticity of data corresponding to the avatar (e.g., the authenticity of one or more image files, three-dimensional models, etc.) and further by regularly re-authenticating the avatar data within defined periods of time (e.g., using a heartbeat authentication process). In some examples, to prove the authenticity of data corresponding to an avatar, a client computing device (e.g., used by a user associated with the avatar to access a metaverse) provides satisfactory evidence to an authentication server node indicating that the data corresponding to the avatar is the same data (e.g., the data has not been modified) that was previously registered by the user onto the blockchain.

While an authenticated avatar is active (e.g., present in a metaverse), in some examples, a client computing device associated with a user of the avatar performs re-authentication processes at specific periods within an epoch of time to prove liveliness. For example, if one epoch is defined to consist of twelve (12) periods of five (5) minutes each, then the client computing device re-authenticates the avatar approximately every five minutes. This can be referred to as a "heartbeat authentication" process or periodic avatar authentication process, which proves that the client computing device is "alive" and that a malicious entity has not stolen the avatar. The heartbeat authentication method permits one or more client computing devices to prove that a user has been in continuous control over the data corresponding to an avatar between heartbeats, and thus reduces or prevents the chances that an attacker can successfully mount a "fake avatar attack" (e.g., by creating a copy or stealing an avatar and posing as the owner of the avatar in a metaverse). As described in more detail herein, the proposed process for the periodic heartbeat authentication of avatars relies on the combined use of (i) a keyed-hash function (such as, e.g., hash-based message authentication code (HMAC) techniques including the RFC2104 standard), (ii) a key-release sequencing mechanism, and (iii) one or more authentication server nodes within a decentralized blockchain network.

Initial Avatar Registration and Embedding Serial Numbers

Prior to using an avatar in any metaverse, in some examples, a user registers ownership of the avatar onto a blockchain. For example, a user can use a client computing device to record or register an avatar ownership claim record onto a blockchain. For each avatar that a user desires to use (e.g., each user avatar, object avatar, etc.), the generation of an avatar ownership claim record can initially involve a user using a client computing device to generate a seed number from which one or more serial numbers can be derived. A user can use their computing device to generate a separate serial number for each metaverse in which the user intends to use an avatar. In some examples, the user uses a client application to embed the serial number in the data representing the avatar (e.g., the image file, three-dimensional model data, etc.), e.g., using a watermarking mechanism, steganography mechanism, or the like.

In some examples, the user uses a client application to compute a hash of the data representing the avatar with the embedded serial number. The user then uses the client computing device to create a transaction on a blockchain containing the hash value of the data representing the avatar, where the computing device digitally signs the transaction using a public/private key pair associated with the user. This process, for example, permits anyone to verify that the data representing the avatar belongs to the user.

In some examples, the user can then use a client computing device to generate an avatar ownership claim record for the data representing the avatar. The avatar ownership claim record can include several data items. In some examples, one data item is a digital identifier of the user as a legal owner. For example, this identifier can include a globally unique digital identifier owned by the user. As another example, this can include a serial number of the user's X.509 digital identity certificate or a hash of a decentralized identifier (or "DID") standard that the user has claimed previously on the blockchain.

In some examples, another possible data item included in an avatar ownership claim record is the serial number of the data representing the avatar. For example, the serial number can be globally unique and match the serial number embedded (e.g., watermarked) with the data representing the avatar. In some examples, another data item includes a cryptographic digest of the avatar image file, where the digest is a one-way hash function of the data representing the avatar (e.g., using the SHA-512 hash standard). In some examples, another data item includes a copyright registration number, which can be issued by a legal authority in a given jurisdiction (e.g., by the United States Copyright Office for user located in the United States). In some examples, another data item includes a timestamp indicating a date and time at which the user signed the avatar ownership claim record. In some examples, yet another data item is a digital signature over the avatar ownership claim record, e.g., using a standard digital signature algorithm.

It is noted that in some examples, the embedded serial number is generated by the client and is unique for each metaverse within which a user deploys the avatar. Thus, although for the human eye (e.g., a person viewing a display screen), two avatars deployed at different metaverses may appear to be identical, when one or more computing devices provide the data representing each of the two avatars (each having embedded a different serial number) to a one-way cryptographic hash function, the resulting digest values will differ.

Periodic Heartbeat Authentication of Data Representing an Avatar

Once a user uses a client computing device to successfully authenticate an avatar and is currently using the avatar within a metaverse platform, in some examples, the client computing device periodically performs an efficient re-authentication process. This periodic re-authentication between a client computing device and a server is referred to herein as a periodic heartbeat authentication process or event, or a periodic avatar authentication process. In some examples, for an epoch of time consisting of P periods, the client computing device and an authentication server node perform P periodic heartbeat authentication events. A client computing device performs this periodic re-authentication in part by computing an authenticating ticket (or "auth-ticket") for the data representing the avatar and by transmitting the authenticating ticket together with the data representing the avatar to the authentication server node.

Figure 3:
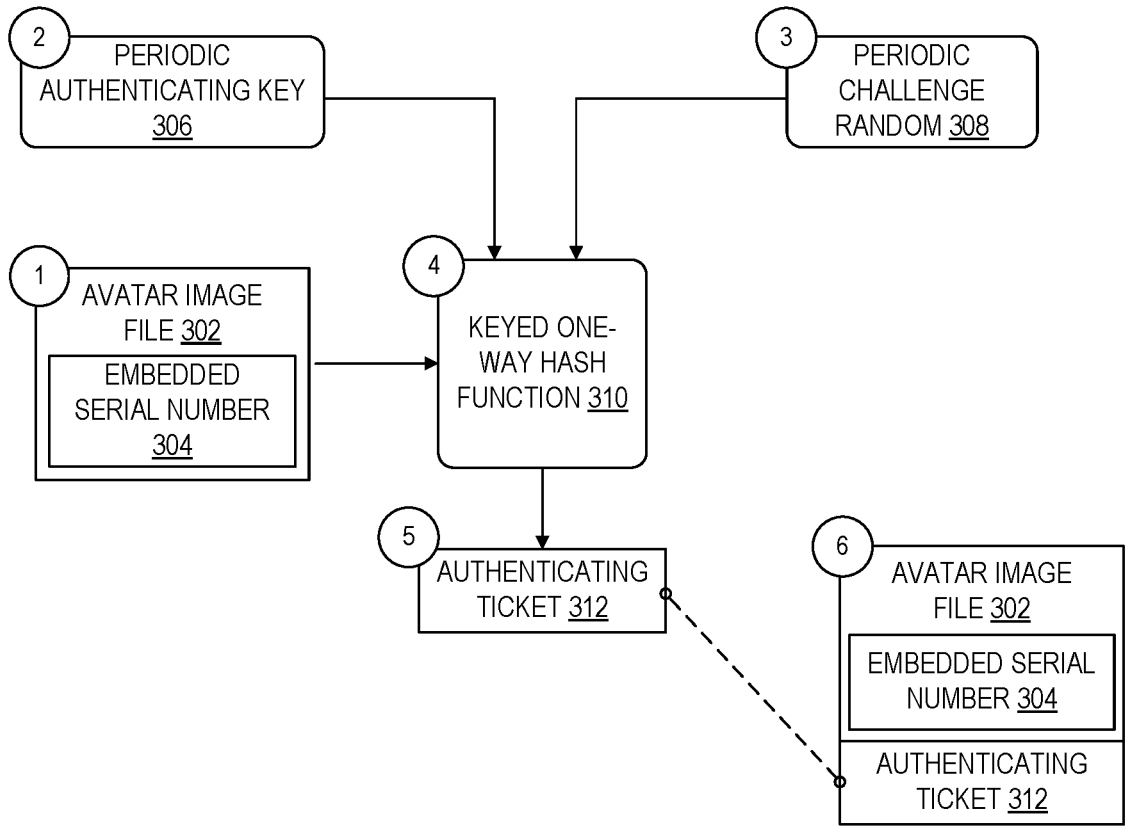
FIG. 3 is a diagram illustrating the use of an avatar image file to compute an authenticating ticket for periodic heartbeat authentications according to some examples.

In some examples, for each heartbeat authentication event, the authentication server node transmits a periodic challenge random (or "PCR") number $r_i$, which is then included by the client computing device as input into the authenticating ticket computation process. FIG. 3 is a diagram illustrating the use of an avatar image file to compute an authenticating ticket for periodic heartbeat authentications according to some examples.

In FIG. 3, a process is shown for computing an authenticating ticket 300 for one period of time within an epoch. In some examples, an application running on a client computing device (e.g., a metaverse client application) obtains some or all the following data items: at the circle labeled "1," the data representing the avatar of interest, including an embedded serial number (e.g., represented by the avatar image file 302 and the embedded serial number 304); at the circle labeled "2," a periodic authenticating key 306 K for the reauthentication event; and at the circle labeled "3," the periodic challenge random 308 number r from the server.

In some examples, at circle "4," the client computing device provides the three data items as input to a keyed one-way hash function 310 using key 306 $K_i$, which in turn yields a digest of a given fixed length (e.g., 512 bits), which is referred to as the authenticating ticket 312.

In some examples, for a given re-authentication period $P_i$, the client computing device responds to the authentication server node by transmitting the following to the authentication server node: the avatar image file 302; the authenticating ticket 312 for the avatar image file 302; and the periodic authenticating key of the previous re-authentication event at period $P_{(i-1)}$. For example, by providing the previous periodic authenticating key permits the authentication server node to obtain assurance that the avatar is source-authentically from the same user (e.g., client computing device). In some examples, a client computing device sending these and other items of information to an authentication server node uses a secure and mutually authenticated communication channel (e.g., a network connection secured using Transport Layer Security (TLS) or other cryptographic protocols).

Epochs of Periodic Re-Authentication

In some examples, the periodic heartbeat authentication process illustrated above is repeated P times within a defined epoch E, each time using a different periodic authenticating key. Thus, for example, if a metaverse platform or other entity defines an epoch to be one (1) hour and each heartbeat period is set to be five (5) minutes, then the client computing device performs the heartbeat authentication process twelve (12) times within that hour. As indicated, each metaverse platform can define the parameter values of the period P and the epoch E or, in other examples, a client computing device and a metaverse platform can negotiate the values using a heartbeat authentication negotiation protocol.

In some examples, to perform the periodic heartbeat authentication process, a client computing device initially prepares (e.g., precomputes) multiple sets of periodic authenticating keys (or "PAKs") corresponding to the projected length of the presence of the avatar in a given metaverse. These collections of periodic authenticating keys associated with a particular metaverse can be referred to as periodic authenticating key sets.

In some examples, a client computing device can be concurrently engaged with multiple metaverses, and the client computing device can prepare (e.g., precompute) multiple corresponding periodic authenticating key sets for each metaverse. The multiplicity of periodic authenticating key sets associated by a client with a metaverse can be referred to as periodic authenticating key multi-sets. Thus, using the previous example, if a user using a client computing device desires to interact with an online platform (e.g., a metaverse) for four (4) hours, the client computing device can precompute four (4) periodic authenticating key sets (e.g., where each periodic authenticating key set includes twelve (12) periodic authenticating keys).

Precomputation of the Periodic Authenticating Key Evidence

In some examples, for a given periodic authenticating key generated by the client computing device (e.g., as part of a periodic authenticating key set), the client computing device also computes periodic authenticating key evidence corresponding to that periodic authenticating key before using the key. The client computing device records the periodic authenticating evidence to a blockchain ahead of time, e.g., prior to using the corresponding periodic authenticating key set with the elected authentication server node. In general, there is no limit to a number of periodic authenticating key sets and periodic authenticating key evidence that can be prepared (e.g., pre-computed) by a client computing device.

Figure 4:
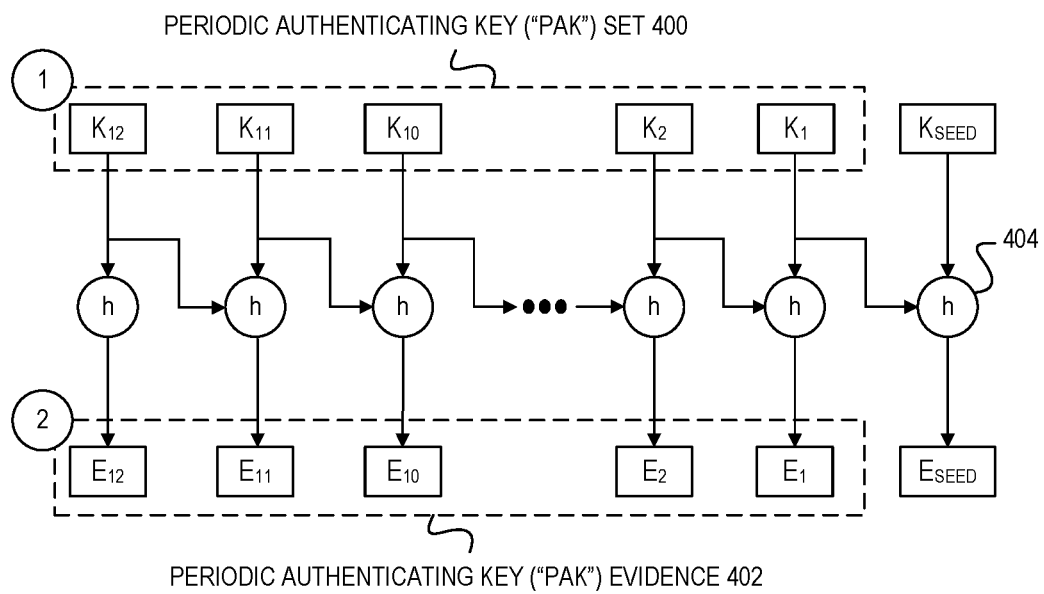
FIG. 4 is a diagram illustrating an example process for generating keys in a periodic authenticating key set and further generating periodic authenticating key evidence using an example of one epoch consisting of twelve periods according to some examples.

FIG. 4 is a diagram illustrating an example process for generating keys in a periodic authenticating key set and the periodic authenticating key evidence using an example of one epoch consisting of twelve periods according to some examples. In the example of FIG. 4, an epoch of time (e.g., one hour as determined by a metaverse platform or other entity) is divided into twelve (12) units, thereby indicating that a client computing device and authentication server are to perform a heartbeat authentication process once every five (5) minutes.

In some examples, the process for creating a periodic authenticating key set 400 and periodic authenticating key evidence 402 includes a client computing device generating a random symmetric key (e.g., the periodic authenticating key) corresponding to each period in the epoch, with an extra random key referred to as the seed key (e.g., $K_{SEED}$ in FIG. 4). For example, in the case of a metaverse platform defining an epoch to be one (1) hour in time duration consistent of twelve (12) periods, the client computing device can generate twelve (12) periodic authenticating keys (e.g., shown by the circle labeled "1" in FIG. 4).

In some examples, using the set of randomly generated periodic authenticating keys, the client computing device further computes a set of periodic authenticating key evidence following a reverse pattern sequence shown in FIG. 4. Once the client computing device generates the random keys and the seed key, it orders the keys according to its planned usage within the time slot of the epoch. Starting from the key to be utilized by a client computing device last (e.g., key $K_{12}$), it uses the key and its predecessor to compute the evidence for that key. Thus, for example, to compute the evidence $E_1$ for the key $K_1$, the client computing device uses both the keys $K_1$ and $K_2$ as input into the hash function 404. This chained input to the hash function effectively creates a connection for each key in the periodic authenticating key set, and the authentication server node can later verify this link-relationship among the keys. In some examples, the client computing device records or registers the periodic authenticating key evidence to the blockchain prior to using it for heartbeat authentication events.

Registering the Periodic Authenticating Key Evidence on a Blockchain and Closing after Usage In some examples, after a client computing device creates the periodic authenticating key evidence, the client computing device records the set of evidence onto a blockchain in such a way that the information is accessible (e.g., readable) by the authentication server nodes at a later time. When recording the periodic authenticating key evidence to the blockchain, in some examples, the client computing device includes a timestamp that indicates that the recording to the blockchain occurred prior to the time at which the client computing device uses the periodic authenticating keys in an authentication event with the elected authentication server node.

In some examples, a client computing device also includes a proof of possession (or "POP") public key with the periodic authenticating key evidence data structure on the blockchain. This proof of possession public key enables the client computing device to later "close" (e.g., terminate or nullify) the periodic authenticating key evidence by signing a closing transaction for the periodic key evidence using the corresponding proof of possession private key. This signals to other entities (e.g., entities who read periodic authenticating key evidence data structure from the blockchain) that the party (e.g., the user of the client computing device) who created the periodic authenticating key evidence is the same party that terminates or nullifies the periodic authenticating key evidence as being no longer usable (e.g., the periodic authenticating key set has been fully consumed in a session with the authentication server node). For example, a client computing device can use a closing transaction (using the proof of possession key pair) to prevent malicious users from stealing or otherwise using the periodic authenticating key evidence on the blockchain and replaying it (e.g., a replay attack) to an authentication server node. A closing transaction also permits the option for a user to remain anonymous when registering the periodic authenticating key evidence to the blockchain.

In some examples, whenever an authentication server node engages a client computing device in a decentralized authentication protocol, the authentication server node checks the blockchain to determine whether the periodic authenticating key evidence is still "fresh" (e.g., that is hasn't been used) by validating that the same client computing device that registered the periodic authenticating key evidence has not issued any closing transactions. In some examples, a client computing device can use a same proof of possession public key for different periodic authenticating key evidence on the blockchain (assuming that the user ensures that the proof of possession private key is not disclosed to any entity).

In some examples, the proof of possession public/private key pair is different from the ordinary blockchain key pair used by the client computing device. For example, the key pairs can be different because: (a) the client computing device may be using its ordinary blockchain public/private key pair for other types of transactions (e.g., to buy or sell assets, etc.), and (b) the proof of possession public/private key pair may be anonymous or pseudonymous to protect the privacy of the user of the client computing device.

In some examples, after a periodic authenticating key set and a periodic authenticating key evidence set have been consumed (e.g., used) in heartbeat authentication events within an epoch of time, the client computing device denotes the periodic authenticating key evidence on the blockchain as being consumed (e.g., no longer fresh or valid). This signifies that (a) the client computing device and authentication server have "consumed" or used the periodic authenticating key evidence in a session and thus that the key evidence no longer usable, and (b) prevents other entities in the system from claiming (e.g., in a dishonest way) the periodic authenticating key evidence is theirs. In some examples, this is performed by a client computing device issuing a periodic authenticating key closing transaction to the same blockchain, carrying a hash of the older confirmed block where the periodic authenticating key evidence set is located. The client computing device can digitally sign the closing transaction using the matching proof of possession private key.

Figure 5:
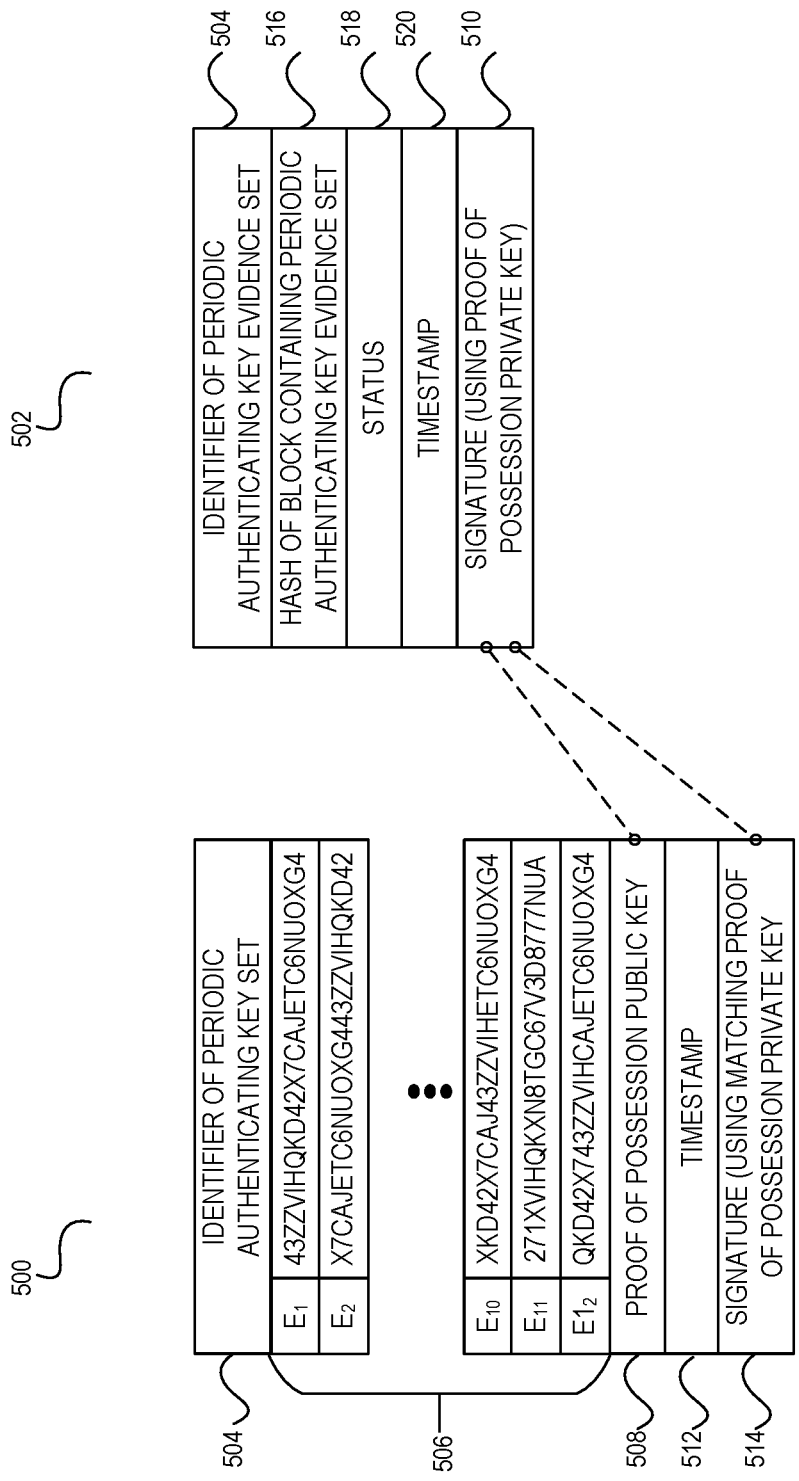
FIG. 5 is a diagram illustrating an example periodic authenticating key evidence data structure in a block within a blockchain, and further illustrating a periodic authenticating key closing transaction structure used to indicate the usage or revocation of a given set of periodic authenticating key evidence according to some examples.

FIG. 5 is a diagram illustrating an example periodic authenticating key evidence data structure in a block within a blockchain, and further illustrating a periodic authenticating key closing transaction structure used to denote usage or revocation of a given periodic authenticating key evidence according to some examples. In FIG. 5, a periodic authenticating key evidence data structure 500 is shown along with a periodic authenticating key closing transaction data structure 502. As shown in FIG. 5, the periodic authenticating evidence set and a closing transaction use a same globally unique identifier 504 (e.g., using a 64-bit UUID standard) to indicate that these are a pair of related data structures on the blockchain. In some examples, the data structure 500 further carries a set of periodic authenticating key evidence 506 generated by a client computing device off-chain (e.g., as described above).

In some examples, the periodic authenticating key evidence data structure 500 on the blockchain also carries a proof of possession public key 508. The client computing device can later use the private key of this public/private key pair to digitally sign a closing transaction to denote that the periodic authenticating key set has been consumed or nullified (e.g., as shown by digital signature 510).

In some examples, the client computing device includes a timestamp 512 and signs 514 the periodic authenticating key evidence data structure on the blockchain using the corresponding proof of possession private key. For example, the private key used to sign the periodic authenticating key evidence data structure matches the public key listed in the proof of possession of public key 508.

In some examples, the closing transaction data structure 502 carries a cryptographic one-way hash 516 of the entire confirmed block (on the blockchain) that contains the previously recorded periodic authenticating key evidence. This enables any entity who seeks to validate the status of a given periodic authenticating key evidence to search through the previous confirmed blocks to locate the identifier of the periodic authenticating key set (e.g., identifier 504) and then validate the hash of the block where the entity found the identifier. The example closing transaction data structure 502 further includes a status 518 (e.g., indicating whether the evidence is used or revoked) and a timestamp 520.

Protocol for Decentralized Avatar Authentication

When a user using a client computing device seeks to prove the authenticity of an avatar image file and prove control over the avatar, according to examples described herein, the client computing device and the authentication server node (e.g., the server) interact using a decentralized avatar authentication protocol. The decentralized avatar authentication protocol message flows use constructs described elsewhere herein including, e.g., a periodic heartbeat authentication process, the periodic authenticating keys, periodic authenticating key evidence, a blockchain, etc.

Overview of the Decentralized Avatar Authentication Protocol

According to examples, to use a decentralized avatar authentication protocol, a user using a client computing device (e.g., via a software application running on the device) initially generates and records a periodic authenticating key evidence set for one or more future epochs of time onto a blockchain. The client computing device invokes a smart contract resulting in the decentralized election of one of the authentication server nodes to serve the client computing device. Once the smart contract elects the authentication server node for the client computing device for the epoch of time, the client computing device notifies a metaverse platform of interest (e.g., an avatar management service of the metaverse platform) of the identity of the elected authentication server node.

In some examples, the client computing device and the authentication server node establish a mutually authenticated secure network channel (e.g., using the TLS protocol), where the client computing device provides information including: (a) an identifier of registered data representing an avatar on the blockchain, and (b) a location on the blockchain of the periodic authenticating key evidence to be used in a future authentication event for the epoch of time.

In some examples, the client computing device and the authentication server node engage in P rounds of the heartbeat authentication process or event (e.g., corresponding to the P periods of time defined within an epoch). For example, if an epoch is defined to be sixty (60) minutes and the metaverse platform requires the client computing device and authentication server to perform a new heartbeat authentication process every five (5) minutes, then there will be P=12 rounds of the heartbeat authentication process or event in that epoch. In this case, the authentication server identifies a plurality of time periods within the epoch, where the client computing device is to authenticate the data used to display an avatar within a computer-simulated environment during each of the plurality of periods of time.

In some examples, the authentication server node provides an authentication result report (or "ARR") to the metaverse platform (e.g., to an avatar management service associated with the metaverse platform) after each heartbeat authentication process. The result report sent or message to the computing environment providing the metaverse platform or other computer-simulated environment, for example, indicates whether the authentication server successfully validated a set of parameters provided to the authentication server by the client computing device. The authentication result report, e.g., enables the metaverse platform to obtain assurance that the user's avatar (e.g., the data used to render or otherwise display the avatar in the virtual world provided by the metaverse platform) displayed by virtue of the client computing device interacting with the metaverse platform is a genuine avatar that the user previously registered on the blockchain.

In some examples, to enable the authentication server node to provide persistent evidence of successful or failed heartbeat authentication an avatar by a client computing device, an authentication server node logs these events onto the blockchain. This provides a persistent archive for both the client computing device and the metaverse platform of heartbeat authentication events. In some examples, the log is referred to as an authentication event conformation log (or "AEC" log). In some examples, the metaverse platform can perform an on-going audit of the authentication events between a client computing device and an elected authentication server node by reading the periodic authenticating key evidence sets and the authentication event confirmation records from the blockchain.

Smart Contract Invocation for Initiating Authentication

To join a metaverse platform and to enable a metaverse platform to accept a user's avatar, in some examples, a user uses an application running on a client computing device to: (a) register a claim of ownership of the avatar to the blockchain, and (b) invoke an authentication initiation smart contract (or "AISC") on the blockchain, where the authentication initiation smart contract is intended for the target metaverse (e.g., the metaverse platform in which the user seeks to use the avatar). An entity controlling or providing a metaverse platform can author the authentication initiation smart contract or any other entity authorized by an entity controlling a metaverse platform can create and publish the smart contract.

In some examples, the code (e.g., text) for the smart contract is publicly readable on the blockchain and defines the parameters to be used by the caller (e.g., a client computing device) to invoke the smart contract. This can include, for example, epoch duration and number of periods within the epoch. For example, the smart contract can indicate that the metaverse platform defines an epoch to be sixty (60) minutes and divided into six (6) periods (of ten (10) minutes each). This indicates to a client computing device, for example, that the client computing device is to expect a heartbeat authentication process to occur every ten minutes.

In some examples, the smart contract defines some or all the following parameters: an identity of the client, an identifier and location of the registered avatar, and an identifier and location of the client computing device's periodic authenticating key evidence on the blockchain. The identity of the client computing device, for example, can include a globally unique digital identifier of the client computing device (e.g., the software used by the user on the client computing device), which can include a public key uniquely associated with the client computing device. The identity of the client computing device can also include serial number of an X.509 digital identity certificate associated with the client computing device, or the hash of the decentralized identifier that the client computing device previously claimed on the blockchain. In some examples, the identifier and location of the registered avatar can include an identifier and location (e.g., a block number) on the blockchain where the user has registered a claim of ownership of the avatar. In some examples, the identifier and location of the periodic authenticating key evidence on the blockchain can include an identifier and location (e.g., a block number) on the blockchain where the client computing device recorded the periodic authenticating key evidence sets to be used in the authentication events with an elected authentication server node.

In some examples, the results of a successful invocation of an authentication initiation smart contract includes several components. For example, invocation of the smart contract can perform a decentralized election of one of the authentication server nodes to serve the requesting client computing device and the metaverse platform. The smart contract can record the public key and identifier of the elected authentication server node (e.g., an IP address, DNS identifier, etc.) to the blockchain, thereby allowing the client computing device and the metaverse platform (e.g., its avatar management service) to identify and locate the authentication server node to be used to intermediate between the client computing device and the metaverse platform in a decentralized manner.

In some examples, successful invocation of an authentication initiation smart contract further includes a notification to a metaverse platform of an impending joining by the client. For example, the elected authentication server node can send a notification off-chain (e.g., out-of-band) to the appropriate interface on the metaverse platform (e.g., an API provided by its avatar management services) to indicate that the client is seeking to join the metaverse platform and intends to use the elected authentication server node. In some examples, because the client computing device inputted the identifier and location of the client computing device's periodic authenticating key evidence on the blockchain (previously recorded there by the client), the authentication server node can now seek to locate the periodic authenticating key evidence on the blockchain and validate the signature of the periodic authenticating key evidence.

Phase-1 and Phase-2 of the Decentralized Avatar Authentication Protocol

Figure 6:
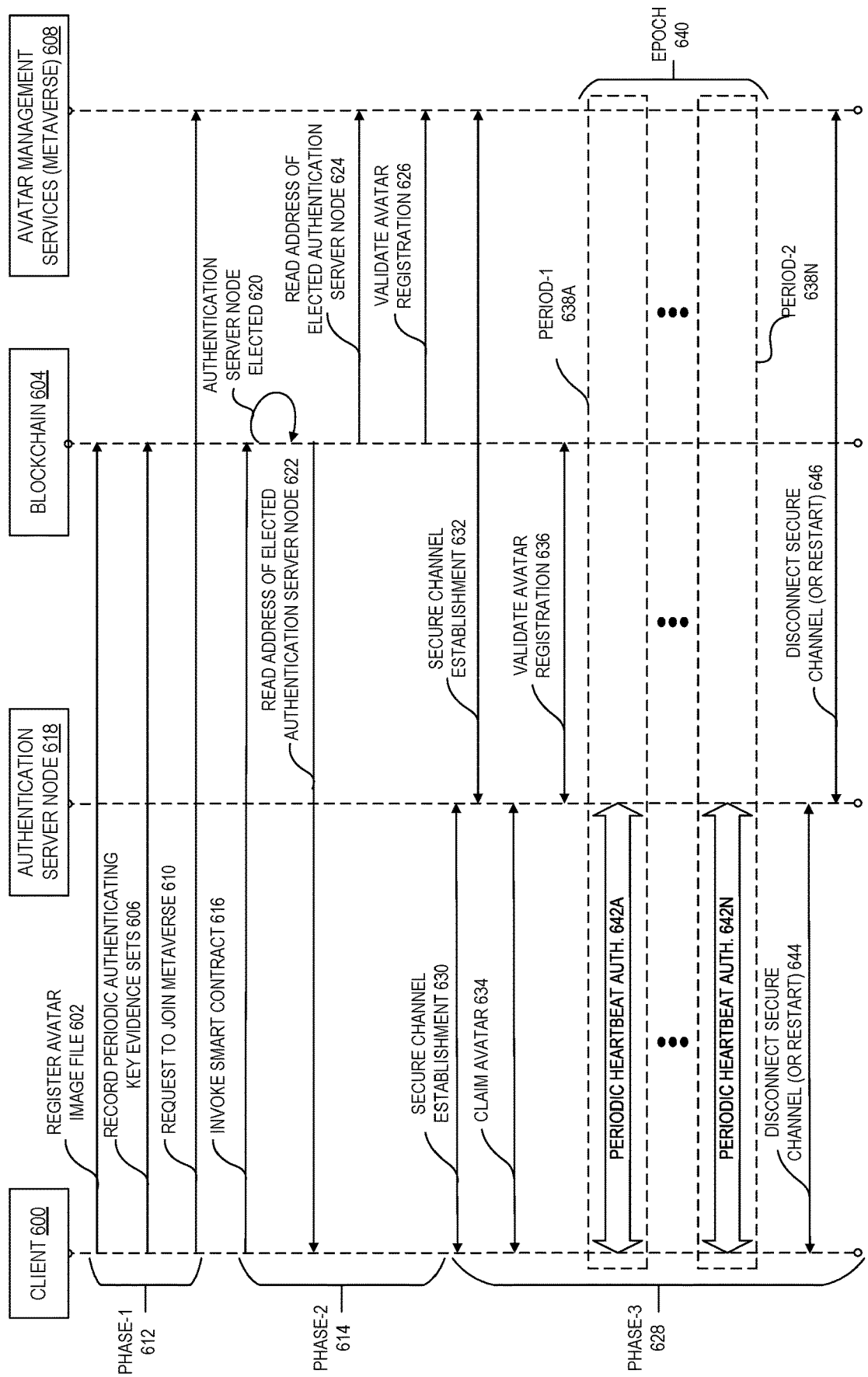
FIG. 6 is a diagram illustrating example phases of a decentralized avatar authentication protocol according to some examples.
Figure 7:
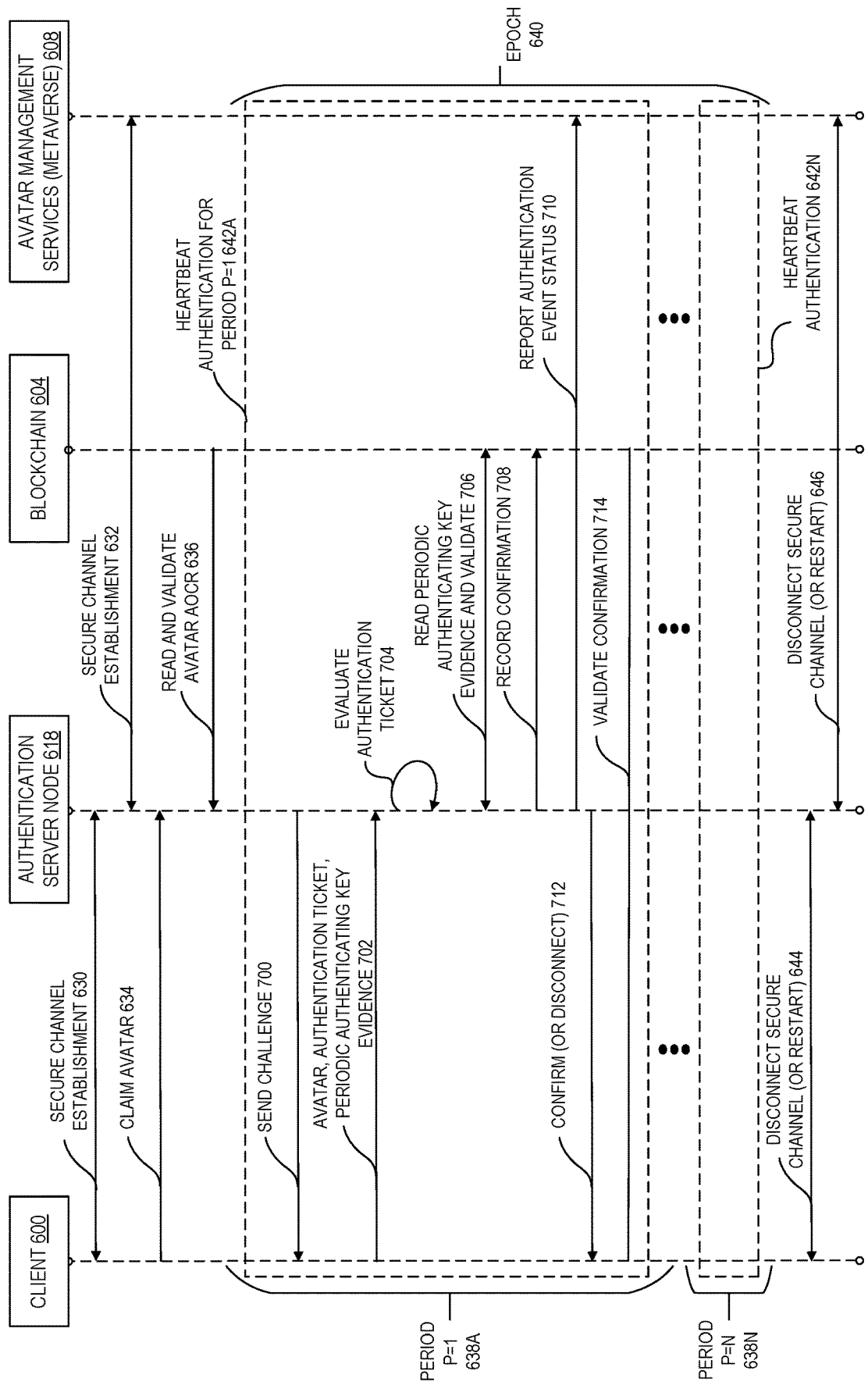
FIG. 7 is a diagram illustrating additional details related to one phase of the decentralized avatar authentication protocol according to some examples.

FIG. 6 and FIG. 7 illustrate example message flows involved in the use of a decentralized avatar authentication protocol as described herein. In some examples, the message flows can be viewed as consisting of groups of related flows separated in three phases, identified herein as Phase-1, Phase-2, and Phase-3.

In some examples, in a Phase-1 612 of the decentralized avatar authentication protocol, a user uses a client computing device 600 initially to claim ownership of an avatar by recording an avatar ownership claim record containing a cryptographic hash of the data representing the avatar to the blockchain. The user can perform this task once for each avatar (e.g., each user avatar, object avatar, etc.) that the user desires to use in one or more metaverse platforms.

Referring FIG. 6, a client 600 (e.g., a client computing device executing one or more software applications) registers 602 an avatar image file (or any other data representing an avatar) to a blockchain 604 (e.g., using an avatar ownership claim record). The client computing device can then record 606 periodic authenticating key evidence sets to the blockchain 604. Here, the client computing device 600 records the periodic authenticating key evidence sets to the blockchain 604 for future uses, as described elsewhere herein. It is noted that the client 600 can register as many periodic authenticating key evidence sets as desired to the blockchain for future uses.

In some examples, the client 600 sends, to avatar management services 608 (e.g., associated with a metaverse), a request 610 to join a metaverse by interacting with an appropriate endpoint provided by the avatar management services 608 of the metaverse platform. The client 600 can provide a record location of the confirmed blocks on the blockchain 604 where the client's avatar ownership claim record resides on the blockchain. This permits the avatar management services 608 of the metaverse to read the avatar ownership claim record and validate the record independently.

In some examples, at the Phase-2 614, the client 600 invokes 616 (or calls) smart contract code that is already present on the blockchain 604. For example, the client 600 now seeks an authentication sever node 618 to be used to mediate its interaction with the metaverse platform. To obtain the authentication server node 618, the client 600 invokes the smart contract code on the blockchain 604 that has been created by the blockchain community to elect an authentication server node 618.

The invocation of the smart contract code on the blockchain 604 results in a consensus algorithm in the blockchain 604 electing 620 an authentication server node 618 that can serve the client 600 and the metaverse platform as an authentication server node. The smart contract can record the identity, public key, and IP address (or another identifier) of the elected authentication server node 618 to the blockchain 604.

In some examples, the client 600 reads 622 the identity (e.g., the address) of the elected authentication server node 618 by reading the confirmed block on the blockchain that contains the identity, public key, and IP address of the elected authentication server node 618. The avatar management services 608 of the metaverse platform also reads 624 the confirmed block on the blockchain 604 containing the identity, public key, and IP address of the elected authentication server node 618. In some examples, the metaverse avatar management services 608 validates 626 the registered avatar (e.g., the avatar ownership claim record) found on the blockchain 604. For a client 600 that is currently seeking entrance or admission to the metaverse, the avatar management services 608 can validate the avatar ownership claim record on the blockchain 604 by validating the digital signature of the client 600 found on the avatar ownership claim record.

In some examples, during a Phase-3 628, the client 600 establishes 630 a secure communication channel with the authentication server node 618, and the authentication server node 618 establishes 632 a secure communication channel with the avatar management services 608. The client 600 then claims 634 the location of the avatar (e.g., a location of the avatar ownership claim record) to the authentication server node 618. The authentication server node 618 can then validate 636 the avatar ownership claim record from the blockchain 604. The client 600 and the authentication server node 618 then perform, during a period-1 638A through period-N 638N forming an epoch 640, a corresponding series of periodic heartbeat authentications 642A, . . . , 642N. Once complete, in some examples, the client 600 can disconnect (or restart) 644 the secure channel with the authentication server node 618, and the authentication server node 618 can disconnect (or restart) 646 the secure communication channel with the avatar management services 608. FIG. 7 provides additional details related to the processes performed in phase-3 628.

Phase-3 of the Decentralized Avatar Authentication Protocol

FIG. 7 illustrates additional details related to the Phase-3 of the decentralized avatar authentication protocol. In Phase-3, the client 600 interacts with the authentication server node 618 throughout the duration an epoch and performs P number of heartbeat authentications (including, e.g., the heartbeat authentication 642A, . . . , 642N). For each epoch (e.g., epoch 640), in some examples, the client 600 uses an unused periodic authenticating key evidence set and closes it (e.g., by nullifying it with a closing transaction) after the end of the epoch. The client 600 can seek to connect to the metaverse platform for a long duration (e.g., where an epoch E=5 hours), where each epoch has a duration of P=12 periods. In this example, the client 600 ensures that at least sixty (60) unused periodic authenticating key evidence sets have been recorded on the blockchain 604 prior to engaging with the metaverse platform. It is noted that even while the client 600 is connected to the metaverse platform, the client 600 can continue to concurrently record/register new periodic authenticating key evidence sets (e.g., if it is expected that additional time is to be spent in the metaverse).

Referring to FIG. 7, and similar to the process shown in FIG. 6, the client 600 initially establishes 630 a secure communication channel with the elected authentication server node 618. For example, with the IP address or other identifier of the elected authentication server node 618 (from Phase-2 above), the client 600 initiates the establishment of a secure communication channel with the authentication server node.

In some examples, the authentication server node establishes 632 a secure connection with the avatar management service 608. For example, the avatar management service 608 can use the identity and IP address of the elected authentication server node 618 to accept the request to establish the secure channel.

In some examples, the client claims 634 an avatar that it intends to use in the metaverse, e.g., by indicating to the authentication server node 618 a location of a corresponding avatar ownership claim record on the blockchain 604. The authentication server node obtains the identifier of a block on the blockchain including the avatar ownership claim record for the avatar, and validates the record as described hereinafter. In some examples, each of the client 600, authentication server node 618, and avatar management services 608 reference the same data representing the avatar (e.g., as registered in the avatar ownership claim record on the blockchain)—otherwise, if the client 600 provides an avatar image that is different from the one in the corresponding avatar ownership claim record, the authentication server node 618 can identify this difference when the record is validated.

In some examples, the authentication server node 618 reads or otherwise obtains the avatar ownership claim record from the block on the blockchain based on the identifier. For example, the authentication server node 618 can validate the avatar ownership claim record by verifying the digital signature associated with the avatar ownership claim record.

In some examples, the authentication server 618 identifies a plurality of periods of time in an epoch, where the client computing device 600 is to authenticate the data used to represent the avatar within the computer-simulated environment provided by the metaverse platform during each of the plurality of periods of time. During a first period of time of the plurality of periods of time, the authentication server node 618 initiates a heartbeat authentication event (e.g., shown as heartbeat authentication for period P=1 642A in FIG. 7).

In some examples, during the heartbeat authentication event, the authentication server node 618 sends 700, to the client 600, a random value (e.g., a period challenge random) using the secure communication channel established between the devices. In some examples, the client 600 uses the received random value (along with the data used to represent the avatar and a periodic authenticating key) to create an authenticating ticket. The client 600 then sends 702 the data used to display the avatar within the computer-simulated environment, the authenticating ticket, the location of the periodic authenticating key evidence stored on the blockchain and corresponding to the periodic authenticating key used to create the authenticating ticket, and the periodic authenticating key from the previous heartbeat authentication event. If the authentication server node 618 and the client 600 are performing the first heartbeat authentication of the epoch, then the value for the periodic authenticating key from the previous heartbeat authentication event is null.

In some examples, the authentication server node 618 evaluates 704 the authentication ticket and other received parameters. As part of the validation, the authentication server node 618 can obtain 706 the periodic authenticating evidence set from the block on the blockchain identified by the client 600. In some examples, the authentication server node 618 can further validate the parameters by comparing a hash value generated based on previous periodic authenticating keys to the evidence set on the blockchain. If the authentication server node 618 successfully authenticates the parameters during the heartbeat authentication event then, in some examples, the authentication server node 618 records the outcome to the blockchain 604 (or records a failure in the case of a failed authentication). Furthermore, the authentication server node 618 reports 710 the outcome of the heartbeat authentication event to the avatar management services 608 of the metaverse platform.

In some examples, if the heartbeat authentication event is successful, the authentication server node 618 further sends 712 a confirmation message to the client 600 (or if the authentication event fails, the authentication server node 618 can optionally disconnect from the client 600 and terminate the entire session in the epoch). In some examples, the client 600 can optionally validate 714 from the blockchain 604 the record recorded by the authentication server node 618 regarding the outcome of the heartbeat authentication event 642A. As shown in FIG. 7, the client 600 and authentication server node 618 can repeat the heartbeat authentication process during a plurality of periods of time depending on the number of periods in an epoch, as described above. In some examples, the client 600 can subsequently either review the secure communication channel with the authentication server node 618 or disconnect. When the epoch is over, the client 600 and the avatar management services 608 of the metaverse platform can determine whether to terminate their interaction or can choose to restart a new epoch.

Simultaneous Authentication for Multiple Metaverses

Figure 8:
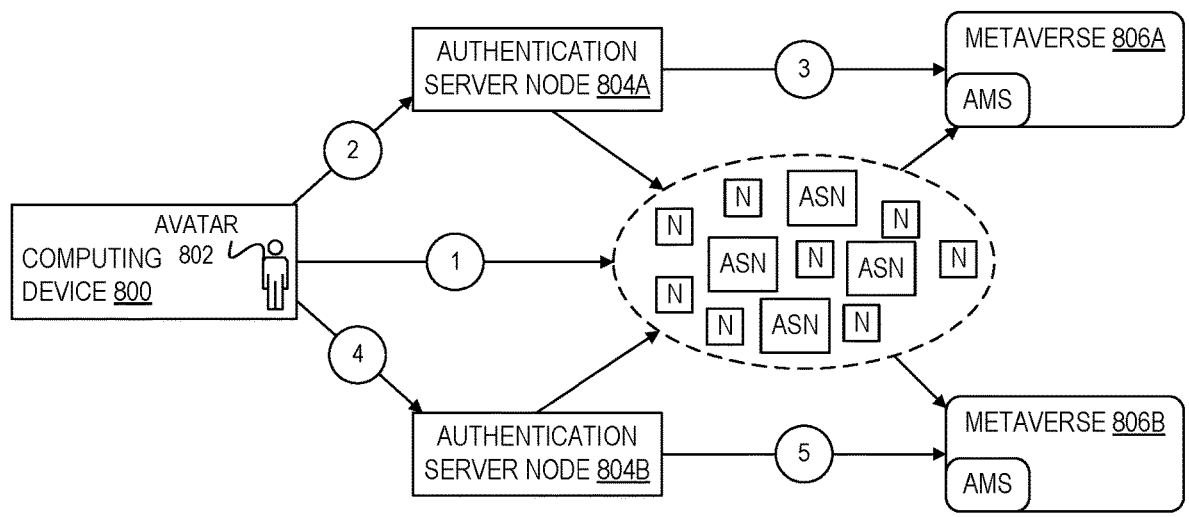
FIG. 8 is a diagram illustrating an example computing environment in which client computing devices perform concurrent heartbeat authentication processes in connection with multiple authentication server nodes for multiple metaverse platforms according to some examples.

In some examples, a user using a client computing device can interact with multiple online platforms (e.g., different metaverses or virtual worlds) concurrently in time. For example, a user can use one or more client computing devices to connect to an online gaming platform and also to one or more metaverse platforms that are distinct from one another, but where digital assets purchased via a metaverse platform can be visually displayed by the user in the online gaming platform, or vice versa. FIG. 8 illustrates an overview of simultaneous heartbeat authentication with multiple authentication server nodes for different metaverse platforms according to some examples.

In the example of FIG. 8, the client computing device 800 associated with an avatar 802 has previously recorded periodic authenticating key evidence onto a blockchain (e.g., as shown in the circle labeled "1"). The client computing device 800 is interacting concurrently with an authentication server node 804A (at the circle "2") and with an authentication server node 804B (at circle "4"). These authentication server nodes are in-turn interacting with the respective metaverse platforms 806A and 806B (e.g., at circles "3" and "5").

The concurrent authentication for multiple online platforms involves a number of a considerations. As one example, for a given epoch of time, a client 800 may concurrently use a same periodic authenticating key set and periodic authenticating key evidence independently with different authentication server nodes. For example, in each case, the authentication server node challenges the client computing device 800 with a different random value used as a periodic challenge random. The use of different random challenge values results in different authenticating tickets for each of the authentication server nodes. As another consideration, the simultaneous authentication with multiple platforms involves the use of a periodic authenticating key set in a same epoch of time. This means, for example, that the client computing device 800 ensures that it maintains synchronization of time when engaging the multiple metaverse platforms.

Figure 9:
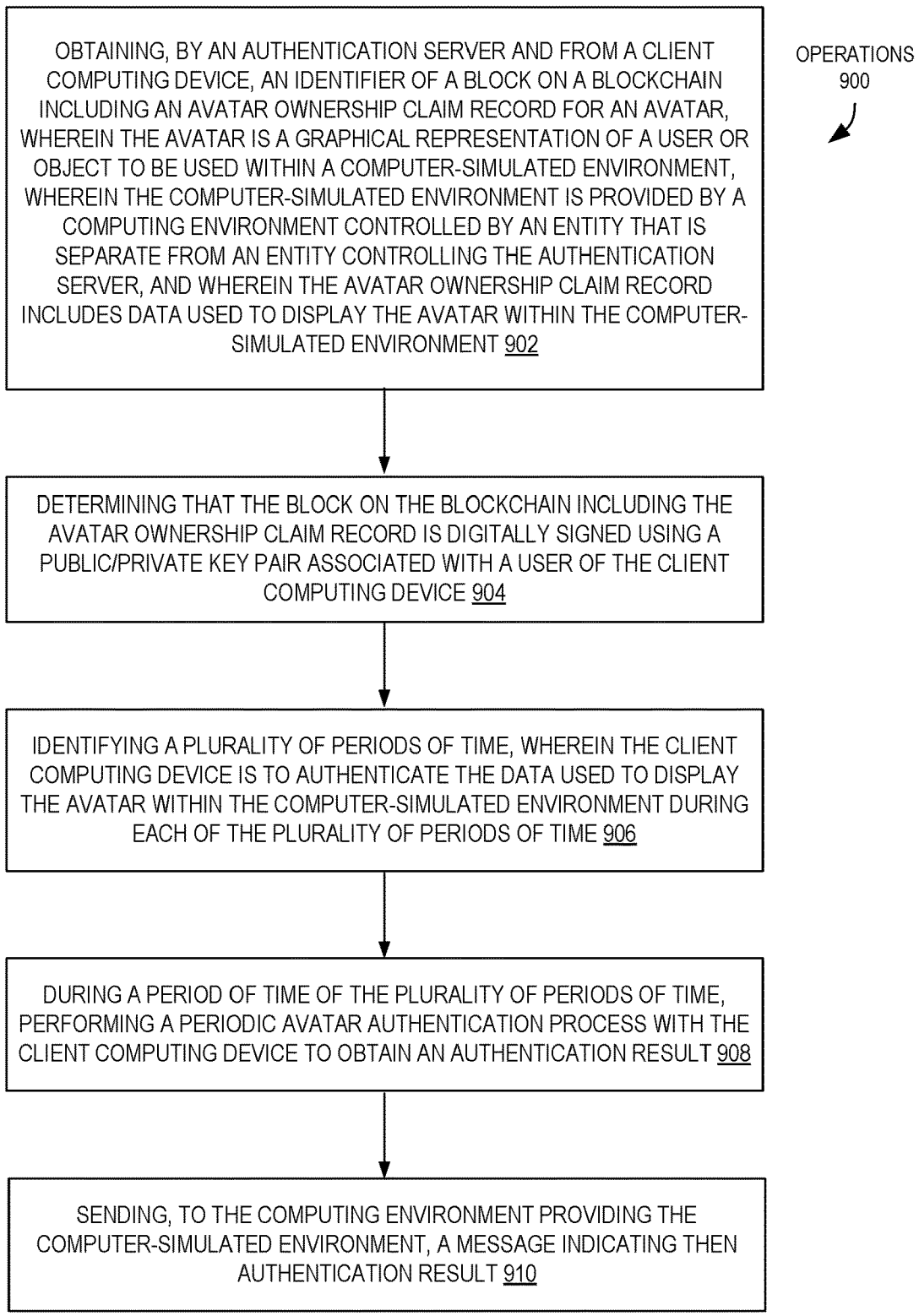
FIG. 9 is a flow diagram illustrating operations performing a decentralized avatar authentication protocol according to some examples.

FIG. 9 is a flow diagram illustrating operations 900 of a method for performing a decentralized avatar authentication protocol according to some examples. Some or all the operations 900 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 900 are performed by an authentication server node or other components of the other figures.

The operations 900 include, at block 902, obtaining, by an authentication server and from a client computing device, an identifier of a block on a blockchain including an avatar ownership claim record for an avatar, wherein the avatar is a graphical representation of a user or object to be used within a computer-simulated environment, wherein the computer-simulated environment is provided by a computing environment controlled by an entity that is separate from an entity controlling the authentication server, and wherein the avatar ownership claim record includes data used to display the avatar within the computer-simulated environment.

The operations 900 further include, at block 904, determining that the block on the blockchain including the avatar ownership claim record is digitally signed using a public/private key pair associated with a user of the client computing device.

The operations 900 further include, at block 906, identifying a plurality of periods of time, wherein the client computing device is to authenticate the data used to display the avatar within the computer-simulated environment during each of the plurality of periods of time.

The operations 900 further include, at block 908, during a period of time of the plurality of periods of time, performing a periodic avatar authentication process with the client computing device to obtain an authentication result.

The operations 900 further include, at block 910, sending, to the computing environment providing the computer-simulated environment, a message indicating then authentication result.

In some examples, the periodic avatar authentication process includes: sending, to the client computing device, a random value; obtaining, from the client computing device, a set of parameters including: the data used to display the avatar within the computer-simulated environment, an authenticating ticket generated by the client computing device, wherein the client computing device generates the authenticating ticket by providing as input to a hash function: the random value, a current authenticating key of a set of periodic authenticating keys generated by the client computing device, and the data used to represent the avatar within the computer-simulated environment, and a previous periodic authenticating key from the set of periodic authenticating keys, wherein the previous periodic authenticating key was used in a previous period of time of the plurality of periods of time.

In some examples, the client computing device obtains periodic authenticating key evidence by providing pairs of periodic authenticating keys from the set of periodic authenticating keys as input to a hash function, and wherein the client computing device records one or more records on the blockchain including the periodic authenticating key evidence.

In some examples, the client computing device obtains periodic authenticating key evidence by providing pairs of periodic authenticating keys from the set of periodic authenticating keys as input to a hash function, and wherein the client computing device records one or more records on the blockchain including the periodic authenticating key evidence, and wherein the method further comprises validating, by the authentication server, the set of parameters by: providing previous periodic authenticating keys as input to a hash function to obtain a result, and comparing the result to the periodic authenticating key evidence.

In some examples, the client computing device obtains periodic authenticating key evidence by providing pairs of periodic authenticating keys from the set of periodic authenticating keys as input to a hash function, wherein the client computing device records one or more records on the blockchain including the periodic authenticating key evidence, and wherein the method further comprises identifying, on the blockchain, a record indicating that the periodic authenticating key evidence is no longer valid.

In some examples, the operations further include storing, on the blockchain, a record indicating whether the authentication server successfully validated the set of parameters.

In some examples, the data used to display the avatar within the computer-simulated environment is embedded with a serial number generated by the client computing device, and wherein the serial number is associated with the computer-simulated environment.

In some examples, the operations further include performing a plurality of periodic avatar authentication processes including the periodic avatar authentication process, wherein a separate periodic avatar authentication process is performed for each period of time of the plurality of periods of time.

In some examples, the authentication server is elected by execution of a smart contract on the blockchain, and wherein the smart contract elects the authentication server by selecting the authentication server from a plurality of candidate authentication servers.

In some examples, the computer-simulated environment provides at least one of: a social interaction-based virtual world, or a gaming environment.

Implementation Mechanism—Hardware Overview

According to one example, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 10:
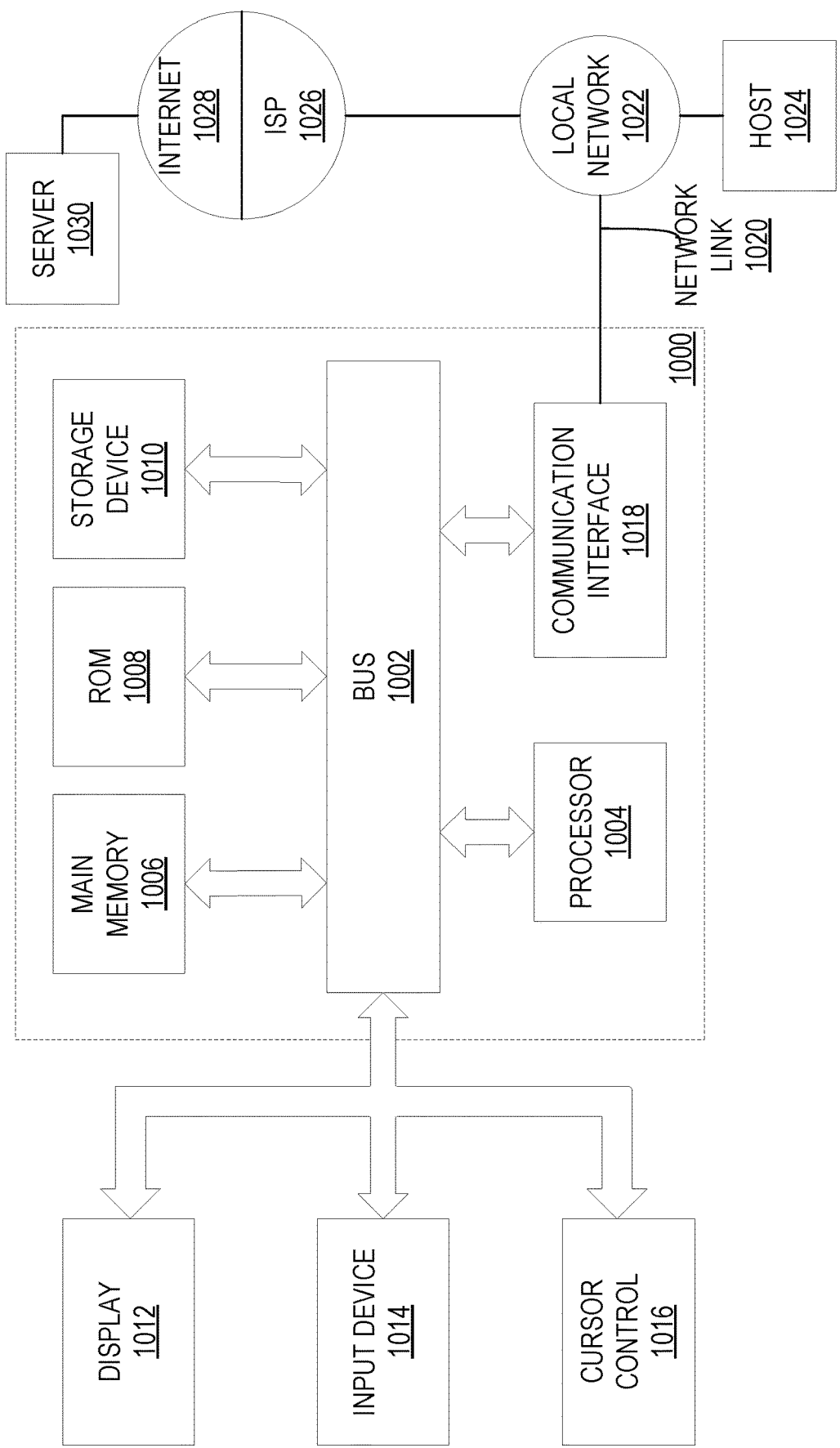
FIG. 10 is a block diagram illustrating an example computer system that may be used in some examples.

FIG. 10 is a block diagram that illustrates a computer system 1000 utilized in implementing the above-described techniques, according to an example. Computer system 1000 may be, for example, a desktop computing device, laptop computing device, tablet, smartphone, server appliance, computing mainframe, multimedia device, handheld device, networking apparatus, or any other suitable device.

Computer system 1000 includes one or more buses 1002 or other communication mechanism for communicating information, and one or more hardware processors 1004 coupled with buses 1002 for processing information. Hardware processors 1004 may be, for example, general purpose microprocessors. Buses 1002 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1000 also includes a main memory 1006, such as a random-access memory (RAM) or other dynamic or volatile storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 a special-purpose machine that is customized to perform the operations specified in the instructions.

Computer system 1000 further includes one or more read only memories (ROM) 1008 or other static storage devices coupled to bus 1002 for storing static information and instructions for processor 1004. One or more storage devices 1010, such as a solid-state drive (SSD), magnetic disk, optical disk, or other suitable non-volatile storage device, is provided and coupled to bus 1002 for storing information and instructions.

Computer system 1000 may be coupled via bus 1002 to one or more displays 1012 for presenting information to a computer user. For instance, computer system 1000 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1012 may include, without limitation, plasma display devices, projectors, cathode ray tube (CRT) monitors, electronic paper, virtual reality headsets, braille terminal, and/or any other suitable device for outputting information to a computer user. In an example, any suitable type of output device, such as, for instance, an audio speaker or printer, may be utilized instead of a display 1012.

One or more input devices 1014 are coupled to bus 1002 for communicating information and command selections to processor 1004. One example of an input device 1014 is a keyboard, including alphanumeric and other keys. Another type of user input device 1014 is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Yet other examples of suitable input devices 1014 include a touch-screen panel affixed to a display 1012, cameras, microphones, accelerometers, motion detectors, and/or other sensors. In an example, a network-based input device 1014 may be utilized. In such an example, user input and/or other information or commands may be relayed via routers and/or switches on a Local Area Network (LAN) or other suitable shared network, or via a peer-to-peer network, from the input device 1014 to a network link 1020 on the computer system 1000.

A computer system 1000 may implement techniques described herein using customized hard-wired logic, one or more ASICs or FPGAs, firmware and/or program logic which in combination with the computer system causes or programs computer system 1000 to be a special-purpose machine. According to one example, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative examples, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or a solid-state drive of a remote computer. The remote computer can load the instructions into its dynamic memory and use a modem to send the instructions over a network, such as a cable network or cellular network, as modulate signals. A modem local to computer system 1000 can receive the data on the network and demodulate the signal to decode the transmitted instructions. Appropriate circuitry can then place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

A computer system 1000 may also include, in an example, one or more communication interfaces 1018 coupled to bus 1002. A communication interface 1018 provides a data communication coupling, typically two-way, to a network link 1020 that is connected to a local network 1022. For example, a communication interface 1018 may be an integrated services digital network (ISDN) card, cable modem, satellite modem, or a modem to provide a data communication connection to a corresponding type of telephone line. As another example, the one or more communication interfaces 1018 may include a local area network (LAN) card to provide a data communication connection to a compatible LAN. As yet another example, the one or more communication interfaces 1018 may include a wireless network interface controller, such as an 802.11-based controller, Bluetooth controller, Long Term Evolution (LTE) modem, and/or other types of wireless interfaces. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by a Service Provider 1026. Service Provider 1026, which may for example be an Internet Service Provider (ISP), in turn provides data communication services through a wide area network, such as the worldwide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

In an example, computer system 1000 can send messages and receive data, including program code and/or other types of instructions, through the network(s), network link 1020, and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. As another example, information received via a network link 1020 may be interpreted and/or processed by a software component of the computer system 1000, such as a web browser, application, or server, which in turn issues instructions based thereon to a processor 1004, possibly via an operating system and/or other intermediate layers of software components.

In an example, some or all the systems described herein may be or comprise server computer systems, including one or more computer systems 1000 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an example, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an example, the cloud-based components may be implemented by third-party entities, on behalf of another entity for whom the components are deployed. In other examples, however, the described systems may be implemented entirely by computer systems owned and operated by a single entity.

In an example, an apparatus comprises a processor and is configured to perform any of the foregoing methods. In an example, a non-transitory computer readable storage medium, storing software instructions, which when executed by one or more processors cause performance of any of the foregoing methods.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, examples of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate examples are discussed herein, any combination of examples and/or partial examples discussed herein may be combined to form further examples.

Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

The invention claimed is:

1. A computer-implemented method comprising:
   obtaining, by an authentication server and from a client computing device, an identifier of a block on a blockchain including an avatar ownership claim record for an avatar, wherein the avatar is a graphical representation of a user or object to be used within a computer-simulated environment, wherein the computer-simulated environment is provided by a computing environment controlled by an entity that is separate from an entity controlling the authentication server, and wherein the avatar ownership claim record includes data used to display the avatar within the computer-simulated environment;
   determining that the block on the blockchain including the avatar ownership claim record is digitally signed using a public/private key pair associated with a user of the client computing device;
   identifying a plurality of periods of time, wherein the client computing device is to authenticate the data used to display the avatar within the computer-simulated environment during each of the plurality of periods of time;
   during a period of time of the plurality of periods of time, performing a periodic avatar authentication process with the client computing device to obtain an authentication result,
      wherein the periodic avatar authentication process includes:
         sending, to the client computing device, a random value;
         obtaining, from the client computing device, a set of parameters including:
            the data used to display the avatar within the computer-simulated environment,
            an authenticating ticket generated by the client computing device, wherein the client computing device generates the authenticating ticket by providing as input to a hash function: the random value, a current authenticating key of a set of periodic authenticating keys generated by the client computing device, and the data used to represent the avatar within the computer-simulated environment, and
            a previous periodic authenticating key from the set of periodic authenticating keys, wherein the previous periodic authenticating key was used in a previous period of time of the plurality of periods of time; and
         sending, to the computing environment providing the computer-simulated environment, a message indicating then authentication result.

2. The computer-implemented method of claim 1, wherein the client computing device obtains periodic authenticating key evidence by providing pairs of periodic authenticating keys from the set of periodic authenticating keys as input to a hash function, and wherein the client computing device records one or more records on the blockchain including the periodic authenticating key evidence.

3. The computer-implemented method of claim 1, wherein the client computing device obtains periodic authenticating key evidence by providing pairs of periodic authenticating keys from the set of periodic authenticating keys as input to a hash function, and wherein the client computing device records one or more records on the blockchain including the periodic authenticating key evidence, and wherein the method further comprises validating, by the authentication server, the set of parameters by:
   providing previous periodic authenticating keys as input to a hash function to obtain a result, and comparing the result to the periodic authenticating key evidence.

4. The computer-implemented method of claim 1, wherein the client computing device obtains periodic authenticating key evidence by providing pairs of periodic authenticating keys from the set of periodic authenticating keys as input to a hash function, wherein the client computing device records one or more records on the blockchain including the periodic authenticating key evidence, and wherein the method further comprises identifying, on the blockchain, a record indicating that the periodic authenticating key evidence is no longer valid.

5. The computer-implemented method of claim 1, further comprising storing, on the blockchain, a record indicating whether the authentication server successfully validated the set of parameters.

6. The computer-implemented method of claim 1, wherein the data used to display the avatar within the computer-simulated environment is embedded with a serial number generated by the client computing device, and wherein the serial number is associated with the computer-simulated environment.

7. The computer-implemented method of claim 1, further comprising performing a plurality of periodic avatar authentication processes including the periodic avatar authentication process, wherein a separate periodic avatar authentication process is performed for each period of time of the plurality of periods of time.

8. The computer-implemented method of claim 1, wherein the authentication server is elected by execution of a smart contract on the blockchain, and wherein the smart contract elects the authentication server by selecting the authentication server from a plurality of candidate authentication servers.

9. The computer-implemented method of claim 1, wherein the computer-simulated environment provides at least one of: a social interaction-based virtual world, or a gaming environment.

10. A non-transitory computer-readable medium having stored thereon instructions that, when executed by one or more processors, cause the one or more processors to perform operations including:
- obtaining, by an authentication server and from a client computing device, an identifier of a block on a blockchain including an avatar ownership claim record for an avatar, wherein the avatar is a graphical representation of a user or object to be used within a computer-simulated environment, wherein the computer-simulated environment is provided by a computing environment controlled by an entity that is separate from an entity controlling the authentication server, and wherein the avatar ownership claim record includes data used to display the avatar within the computer-simulated environment;
- determining that the block on the blockchain including the avatar ownership claim record is digitally signed using a public/private key pair associated with a user of the client computing device;
- identifying a plurality of periods of time, wherein the client computing device is to authenticate the data used to display the avatar within the computer-simulated environment during each of the plurality of periods of time;
- during a period of time of the plurality of periods of time, performing a periodic avatar authentication process with the client computing device to obtain an authentication result,
  - wherein the periodic avatar authentication process includes:
  - sending, to the client computing device, a random value;
  - obtaining, from the client computing device, a set of parameters including:
    - the data used to display the avatar within the computer-simulated environment,
    - an authenticating ticket generated by the client computing device, wherein the client computing device generates the authenticating ticket by providing as input to a hash function: the random value, a current authenticating key of a set of periodic authenticating keys generated by the client computing device, and the data used to represent the avatar within the computer-simulated environment, and
    - a previous periodic authenticating key from the set of periodic authenticating keys, wherein the previous periodic authenticating key was used in a previous period of time of the plurality of periods of time; and
  - sending, to the computing environment providing the computer-simulated environment, a message indicating then authentication result.

11. The non-transitory computer-readable medium of claim 10, wherein the client computing device obtains periodic authenticating key evidence by providing pairs of periodic authenticating keys from the set of periodic authenticating keys as input to a hash function, and wherein the client computing device records one or more records on the blockchain including the periodic authenticating key evidence, and wherein the instructions, when executed by one or more processors, further cause the one or more processors to perform operations including validating, by the authentication server, the set of parameters by: providing previous periodic authenticating keys as input to a hash function to obtain a result, and comparing the result to the periodic authenticating key evidence.

12. The non-transitory computer-readable medium of claim 10, wherein the client computing device obtains periodic authenticating key evidence by providing pairs of periodic authenticating keys from the set of periodic authenticating keys as input to a hash function, and wherein the client computing device records one or more records on the blockchain including the periodic authenticating key evidence.

13. The non-transitory computer-readable medium of claim 10, wherein the client computing device obtains periodic authenticating key evidence by providing pairs of periodic authenticating keys from the set of periodic authenticating keys as input to a hash function, wherein the client computing device records one or more records on the blockchain including the periodic authenticating key evidence, and wherein the instructions, when executed by one or more processors, further cause the one or more processors to perform operations including identifying, on the blockchain, a record indicating that the periodic authenticating key evidence is no longer valid.

14. A computing device comprising:
- a processor; and
- a non-transitory computer-readable medium having stored thereon instructions that, when executed by the processor, cause the processor to perform operations including:
- obtaining, by an authentication server and from a client computing device, an identifier of a block on a blockchain including an avatar ownership claim record for an avatar, wherein the avatar is a graphical representation of a user or object to be used within a computer-simulated environment, wherein the computer-simulated environment is provided by a computing environment controlled by an entity that is separate from an entity controlling the authentication server, and wherein the avatar ownership claim record includes data used to display the avatar within the computer-simulated environment;
- determining that the block on the blockchain including the avatar ownership claim record is digitally signed using a public/private key pair associated with a user of the client computing device;
- identifying a plurality of periods of time, wherein the client computing device is to authenticate the data used to display the avatar within the computer-simulated environment during each of the plurality of periods of time;
- during a period of time of the plurality of periods of time, performing a periodic avatar authentication process with the client computing device to obtain an authentication result;
  - wherein the periodic avatar authentication process includes:
  - sending, to the client computing device, a random value;
  - obtaining, from the client computing device, a set of parameters including:
    - the data used to display the avatar within the computer-simulated environment,
    - an authenticating ticket generated by the client computing device, wherein the client computing device generates the authenticating ticket by providing as input to a hash function: the random value, a current authenticating key of a set of periodic authenticating keys generated by the client computing device, and the data used to represent the avatar within the computer-simulated environment, and a previous periodic authenticating key from the set of periodic authenticating keys, wherein the previous periodic authenticating key was used in a previous period of time of the plurality of periods of time; and sending, to the computing environment providing the computer-simulated environment, a message indicating then authentication result.

15. The computing device of claim 14, wherein the client computing device obtains periodic authenticating key evidence by providing pairs of periodic authenticating keys from the set of periodic authenticating keys as input to a hash function, and wherein the client computing device records one or more records on the blockchain including the periodic authenticating key evidence, and wherein the instructions, when executed by the processor, further cause the processor to perform operations including validating, by the authentication server, the set of parameters by:

providing previous periodic authenticating keys as input to a hash function to obtain a result, and comparing the result to the periodic authenticating key evidence.

16. The computing device of claim 14, wherein the client computing device obtains periodic authenticating key evidence by providing pairs of periodic authenticating keys from the set of periodic authenticating keys as input to a hash function, and wherein the client computing device records one or more records on the blockchain including the periodic authenticating key evidence.

17. The computing device of claim 14, wherein the client computing device obtains periodic authenticating key evidence by providing pairs of periodic authenticating keys from the set of periodic authenticating keys as input to a hash function, wherein the client computing device records one or more records on the blockchain including the periodic authenticating key evidence, and wherein the instructions, when executed by the processor, further cause the processor to perform operations including identifying, on the blockchain, a record indicating that the periodic authenticating key evidence is no longer valid.

* * * * *